United States Patent
Wegener

(10) Patent No.: US 9,088,142 B2
(45) Date of Patent: Jul. 21, 2015

(54) SYSTEMS AND APPARATUS FOR PROTECTING SUBSURFACE CONDUIT AND METHODS OF MAKING AND USING THE SAME

(75) Inventor: Robert W. Wegener, McHenry, IL (US)

(73) Assignee: Terra Technologies, LLC, McHenry, IL (US)

( * ) Notice: Subject to any disclaimer, the term of this patent is extended or adjusted under 35 U.S.C. 154(b) by 0 days.

(21) Appl. No.: 13/106,386

(22) Filed: May 12, 2011

(65) Prior Publication Data

US 2012/0020738 A1 Jan. 26, 2012

Related U.S. Application Data

(60) Provisional application No. 61/366,894, filed on Jul. 22, 2010.

(51) Int. Cl.
*E01F 5/00* (2006.01)
*H02G 9/06* (2006.01)
*H02G 9/02* (2006.01)

(52) U.S. Cl.
CPC . *H02G 9/06* (2013.01); *H02G 9/025* (2013.01)

(58) Field of Classification Search
USPC ............ 405/154.1, 157, 124–126, 184.4; 428/174; 27/20; 52/86, 88
See application file for complete search history.

(56) References Cited

U.S. PATENT DOCUMENTS

| | | | |
|---|---|---|---|
| 382,778 A | 5/1888 | Smith | |
| 603,745 A | 5/1898 | Sewall | |
| 887,284 A * | 5/1908 | Stoffer | 405/126 |
| 1,014,636 A * | 1/1912 | Carroll | 405/126 |
| 1,168,400 A | 1/1916 | Kenway | |
| 1,203,656 A | 11/1916 | Shannon | |
| 1,511,769 A | 10/1924 | Orrock | |
| 2,616,149 A * | 11/1952 | Waller | 264/32 |
| 3,482,406 A | 12/1969 | Schuppisser et al. | |
| 4,171,174 A * | 10/1979 | Larsen | 405/25 |
| 4,314,775 A | 2/1982 | Johnson | |
| 4,537,529 A | 8/1985 | FitzSimons | |
| 4,595,314 A | 6/1986 | Lockwood | |
| 4,618,283 A | 10/1986 | Hilfiker | |
| 4,685,829 A | 8/1987 | Matiere | |

(Continued)

FOREIGN PATENT DOCUMENTS

| | | |
|---|---|---|
| EP | 1475872 | 11/2004 |
| KR | 10-0673542 | 1/2007 |

(Continued)

OTHER PUBLICATIONS

International Search Report for PCT/US2011/036388.

(Continued)

*Primary Examiner* — Sean Andrish
(74) *Attorney, Agent, or Firm* — Scherrer Patent & Trademark Law, P.C.; Stephen T. Scherrer; Monique A. Morneault

(57) ABSTRACT

Systems and apparatuses protect subsurface conduit. Specifically, the systems and apparatuses protect subsurface conduit by disposing one or more rigid caps over a length of the subsurface conduit under a roadway for decreasing and/or eliminating impacts and/or damage to the subsurface conduit caused by automobiles and other vehicles utilizing the roadway. Methods of making and using the same are further provided.

11 Claims, 3 Drawing Sheets

(56) References Cited

U.S. PATENT DOCUMENTS

| | | |
|---|---|---|
| 4,869,294 A | 9/1989 | Matiere |
| 5,207,038 A | 5/1993 | Negri |
| 5,281,053 A | 1/1994 | Matiere |
| 5,326,191 A | 7/1994 | Wilson et al. |
| 5,375,943 A | 12/1994 | McCavour et al. |
| 5,833,394 A * | 11/1998 | McCavour ............... 405/126 |
| 6,050,746 A | 4/2000 | McCavour et al. |
| 6,595,722 B2 | 7/2003 | McCavour |
| 6,808,156 B2 * | 10/2004 | Bond ....................... 249/209 |
| 6,854,928 B2 | 2/2005 | Lockwood |
| 6,874,974 B2 | 4/2005 | VanBuskirk et al. |
| 6,922,950 B2 | 8/2005 | Heierli |
| 7,305,798 B1 | 12/2007 | Heierli |
| 2006/0174549 A1 | 8/2006 | Dagher et al. |

FOREIGN PATENT DOCUMENTS

| | | |
|---|---|---|
| KR | 10-0714438 | 5/2007 |
| KR | 10-0859014 | 9/2008 |
| WO | WO 2005/011077 | 2/2005 |

OTHER PUBLICATIONS

Written Opinion of the International Searching Authority for PCT/US2011/036388.

* cited by examiner

SYSTEMS AND APPARATUS FOR PROTECTING SUBSURFACE CONDUIT AND METHODS OF MAKING AND USING THE SAME

The present invention claims priority to U.S. Provisional Patent Application No. 61/366,894, entitled, "System and Apparatus for Protecting Subsurface Conduit and Methods of Making and Using the Same," filed Jun. 22, 2010, which is incorporated herein in its entirety.

TECHNICAL FIELD

The present invention relates to systems and apparatuses for protecting subsurface conduit. Specifically, the present invention relates to a rigid cap that protects the subsurface conduit. The rigid cap is disposed over the length of the conduit under a roadway for decreasing and/or eliminating pressures and/or damage to subsurface conduit caused by automobiles and other vehicles utilizing the roadway. Methods of making and using the same are further provided.

BACKGROUND

It is, of course, generally known to utilize subsurface conduit for relaying information or transmitting power under a surface of a roadway. Specifically, the network of roads and highways, for example, allow for the placement of conduit that may reach many different locations around the world. The conduit may be utilized for the transport of electricity and electrical signals, such as via communication cables and the like. Typically, the power and/or communication cables may be transported in an assembly, called a duct bank, that may be utilized to hold a plurality of such cables. The cables may be encased in any material known to one of ordinary skill in the art, such as in metal or plastic conduit, cement and/or fired-clay. Subsurface conduit may be assembled together to form a tile of duct, which generally has a square cross-section and may measure approximately 5 inches by 5 inches, formed of cement or fired clay. Typically, tiles may be assembled together to form multiple tile duct ("MTD"), including two or more blocks or tiles of ducts encased together, such as in cement or fired clay.

As noted, roads and highways provide ideal placement of subsurface conduit, generally because of the large network of roads and highways, allowing the conduit to be laid under the roads and highways. Indeed, conduit has been buried under roadways for many years, since the dawn of the modern roadway system. However, buried conduit may be subject to damage from a number of sources. For example, the pressure of vehicles on roadways may impact subsurface conduit deleteriously. Specifically, a typical vehicle may weigh approximately 3000 to 4000 pounds or more. When driven over a roadway, the impact on the roadway surface by the automobile may be transferred to the conduit causing damage to the conduit. Tractor trailers and other large vehicles, such as 18-wheeler semi-trucks may have an even more pronounced effect on subsurface conduit. Specifically, it is estimated that the damage to a roadway surface caused by one 18-wheeler truck having a legal weight limit may be equivalent to 9,600 average automobiles.

In many instances, conduit may be protected from the impact caused by vehicles when buried an adequate distance below the roadway surface, since surrounding substrate may more adequately absorb the impact and damage caused by vehicles. However, in many cases, subsurface conduit may be buried too close to the surface of a roadway, affording inadequate protection for the conduit.

Moving the conduit may not be an option in many circumstances. For example, there simply may not be enough space to move the conduit to protect the conduit fully. Moreover, there may be other structures that may interfere with the movement of the conduit, such as other subsurface conduits, pipes, sewers, gas lines, subways or other like structures. Therefore, moving the conduit may not be practical or even possible. In many cases, it may be more practical to abandon the existing conduit, and construct a new conduit instead. In either event, the conduit may need protection as it rests beneath the pavement of a road or highway.

A need, therefore, exists for systems and apparatuses for protecting subsurface conduit, such as conduit located under a roadway surface. Moreover, a need exists for systems and apparatuses for disposing over subsurface conduit to protect the same.

Moreover, a need exists for systems and apparatuses for protecting subsurface conduit, such as conduit located under a roadway surface, thereby preventing the need to move the conduit, such as if the conduit is subject to damage from vehicles traveling on the surface of the roadway. A need further exists for systems and apparatuses for protecting subsurface conduit, such as electrical and/or communication cables disposed within subsurface ductwork.

Further, a need exists for systems and apparatuses for protecting subsurface conduit, especially in circumstances when it is impractical or impossible to move the conduit. Still further, a need exists for systems and apparatuses for protecting subsurface conduit, wherein the conduit may be tiled together to form multiple tile duct.

SUMMARY OF THE INVENTION

The present invention relates to systems and apparatuses for protecting subsurface conduit. Specifically, the present invention relates to a rigid cap that protects the subsurface conduit. The rigid cap is disposed over a length of the conduit under a roadway for decreasing and/or eliminating pressures and/or damage to subsurface conduit caused by automobiles and other vehicles utilizing the roadway. Methods of making and using the same are further provided.

To this end, in an embodiment of the present invention, an apparatus for protecting subsurface conduit is provided. The apparatus comprises a first leg, a second leg and a protective span between the first leg and the second leg, and a length. The apparatus further comprises a reinforcement material disposed within at least a portion of the first leg, the second leg or the protective span. The protective span is preferably arcuate in shape between the first leg and the second leg.

In another embodiment of the present invention, a system protecting subsurface conduit is provided. The system comprises a protective apparatus comprising a first leg, a second leg and a protective span, and a length; and a conduit disposed beneath the protective span of the apparatus, wherein the apparatus' length covers at least a portion of the conduit.

In an alternate embodiment of the present invention, a system protecting subsurface conduit is provided. The system comprises a first protective apparatus comprising a first leg, a second leg and a protective span, and a length; a second protective apparatus comprising a first leg, a second leg and a protective span, and a length; and a conduit disposed beneath the first protective apparatus and the second protective apparatus, wherein the lengths of the first and second protective apparatuses cover at least a portion of the conduit.

It is, therefore an advantage of the present invention to provide systems and apparatuses for protecting subsurface conduit, such as conduit located under a roadway surface or other like structure.

Moreover, it is an advantage to provide systems and apparatuses for disposing over subsurface conduit to protect the same.

Moreover, it is an advantage to provide systems and apparatuses for protecting subsurface conduit, such as conduit located under a roadway surface, thereby preventing the need to move the conduit, such as if the conduit is subject to damage from vehicles traveling on the surface of the roadway.

It is a further advantage to provide systems and apparatuses for protecting subsurface conduit, such as electrical and/or communication cables disposed within subsurface ductwork.

Further, it is an advantage to provide systems and apparatuses for protecting subsurface conduit, especially in circumstances when it is impractical or impossible to move the conduit.

Still further, it is an advantage to provide systems and apparatuses for protecting subsurface conduit, wherein the conduit may be tiled together to form multiple tile duct.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

Figure 1:
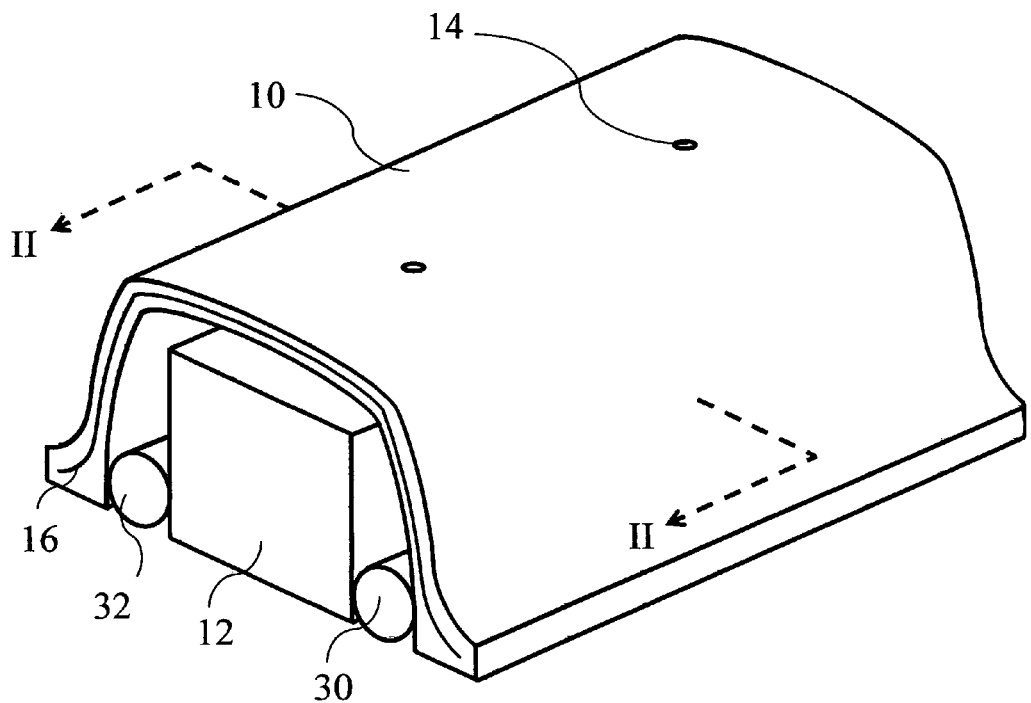
FIG. 1 illustrates an elevated perspective view of a protective cap over a conduit in an embodiment of the present invention.

Systems and apparatuses for protecting subsurface conduit are provided herein with reference to the figures. Specifically, the present invention relates to a rigid cap that protects subsurface conduit. The rigid cap is disposed over a length of the subsurface conduit under a roadway for decreasing and/or eliminating impact and/or damage to the subsurface conduit caused by automobiles and other vehicles utilizing the roadway. Methods of making and using the same are further provided.

Generally, when a street, roadway, highway or other thoroughfare is replaced or repaired, the street may be excavated and a trench may be dug beneath the street. Therefore, the street may be repaired by supplementing or replacing subsurface material disposed beneath the street. After supplementing or replacing the subsurface material beneath the street, the street surface may be replaced. Typically, the subsurface material typically includes a subbase material that may sit atop an earth foundation, such as soil, rock or other material. The subbase material may be coarse stones, fill, dirt or other material. Above the subbase material may be a base course material, typically consisting of smaller stone and dirt material, packed tightly. Above the base course material may be the street subgrade and several other layers of asphalt or concrete that form the street surface upon which vehicles traverse.

Conduit may be disposed beneath streets, roads, highways or other thoroughfares, such as in the form of tile duct, for example. Tile duct may consist of conduit encased in cement, fired clay or other like material. Multiple tile ducts may be disposed together. Typically, the conduit sits atop the earth foundation in the subbase material, although the conduit may sit in other layers of streets closer to the surface. Typically, the fill material of the subbase protects the conduit from the deleterious effects of vehicles traversing the streets. However, over time, the subbase may compact, thereby decreasing the protection of the conduit by the subbase. Moreover, if the conduit is disposed in layers closer to the surface of the road, damage may more readily occur to the conduit. In many circumstances, the conduit may be exposed when the street is excavated for repair or replacement. As noted above, it may be impractical or impossible to move the conduit to a safer location, such as a deeper location, prior to completing the repair and/or replacement of the street.

Although the present invention is described in relation to protection of subsurface conduit, it should be apparent to one of ordinary skill in the art that the components of the present invention, as described in the embodiments presented herein, may be useful for protecting subsurface pipe or any other type of subsurface utility structure known to one skilled in the art.

Moreover, although the present invention is described in relation to protecting structures beneath roadways, it should be apparent to one or ordinary skill in the art that the components of the present invention, as described in the embodiments presented herein, may be useful in protecting structures beneath runways, driveways, parking lots, or any other surface known to one skilled in the art that endures intense pressures. In addition, the present invention may also be useful to protect subsurface structures covered merely by fill material, such as dirt or other common fill materials, even without a surface designed for vehicular traffic. For example, the present invention may be useful to protect subsurface structures where there is simply fill material disposed thereabove, and nothing else.

Referring now to the figures, wherein like numerals refer to like parts, a protective cap 10 is provided, disposed over a conduit 12. The conduit 12, in the shape of a tile duct having a square cross-section, may contain wires and cables, as apparent to one having ordinary skill in the art. The wires and cables may allow for the flow of electricity, such as in power cables and/or communication cables, such as telephone cables. Although the conduit has a square cross-section, as provided herein with reference to FIG. 1, any shaped conduit may be utilized as apparent to one having ordinary skill in the art. Moreover, the conduit may further contain piping, such as for gas, water, sewage, or other like materials.

The conduit may further be a multiple tile duct, in which a plurality of ducts are joined or assembled together to form an assembly of conduits. Specifically, a tile duct may generally have a square cross-section, as noted above, and may generally have dimensions of approximately 5 inches by 5 inches. However, multiple tile duct may have larger dimensions, and may be rectangular or square in cross-sectional shape. For example, multiple tile duct may be rectangular in shape, having two or more tile ducts stacked one atop the other. For example, if a multiple tile duct includes two tile ducts, the dimensions may be approximately 5 inches by 9¼ inches. A three tile duct may have cross-sectional dimensions of approximately 5 inches by 13½ inches. A four tile duct may retain a square cross-sectional shape, and have dimensions of 9¼ inches by 9¼ inches. Any number of tile ducts may be provided in a multiple tile duct system, as apparent to one having ordinary skill in the art.

As shown in FIG. 1, the protective cap 10 may generally fit over the conduit 12, thereby protecting the conduit 12 over a length of the conduit 12. For example, the length of the protective cap 10 may be preferably about eight feet in length, although the protective cap 10 may be any length useful for the purposes of the present invention. A plurality of protective caps 10 may be provided in series and disposed end-to-end to protect a length of conduit larger than the length of a single protective cap 10. The protective cap 10 may preferably be arcuately shaped, in cross-section, so as to impart strength, especially when a substrate fill material is disposed around and atop the protective cap 10. However, the protective cap 10 may be any shape to fit over the conduit 12, such as having right angle corners, or other angled corners, so long as the protective cap 10 fits over the conduit 12 and protects the conduit 12. In another embodiment, the protective cap 10 may have a triangular cross-section, or be pyramidally shaped.

Disposed in one or more discrete locations on a top of the protective cap 10 may be one or more lifting holes 14, whereby a chain or cable (not shown) may be disposed, such as with a T-bar that may fit within the lifting holes 14, for allowing a lift or crane to lift and place the protective cap in a location over the conduit. Plugs (not shown) may be disposed within the lifting holes 14 after the protective cap 10 is moved into place to keep water, soil, rocks or other material from entering the area beneath the protective cap 10. The plugs (not shown) may preferably be made from the same material as the protective cap 10, although the plugs (not shown) may also be different materials.

The protective cap 10 may be made from a material to impart strength to the protective cap. Preferably, the protective cap 10 may be made from cement, concrete, steel or other metal, plastic, fiberglass, composite material or any other material useful for making the protective cap and for its intended purposes. The protective cap 10 should be strong enough to withstand the pressure from dirt, stones, gravel, and/or other fill material that may be disposed around and atop the protective cap 10 and the impact of vehicles that may traverse the road above the protective cap 10. Moreover, the protective cap 10 may preferably be of sufficient strength as to not impact the structural integrity of the pavement of a road disposed thereabove.

Preferably, disposed within the protective cap 10 may be a reinforcing material 16. The reinforcing material 16 aids in providing rigidity and strength to the protective cap 10. For example, the reinforcing material 16 may allow the protective cap to be made from concrete, in which case the reinforcing material 16 may allow the protective cap 10 to be lifted and moved in a position over the conduit 12 without breaking, shattering, cracking or suffering other damage. Moreover, if the protective cap 10 cracks for any reason, the reinforcing material 16 may hold the protective cap 10 together, minimizing devastating structural damage to the protective cap 10, such as collapse thereof. Preferably, the reinforcing material 16 may be made of metal, such as a metal grid or mesh. Other material that may be useful may include rebar, steel plates, plastic mesh, fiberglass mesh or other reinforcing material that may be useful to reinforce the protective cap 10.

Figure 2:
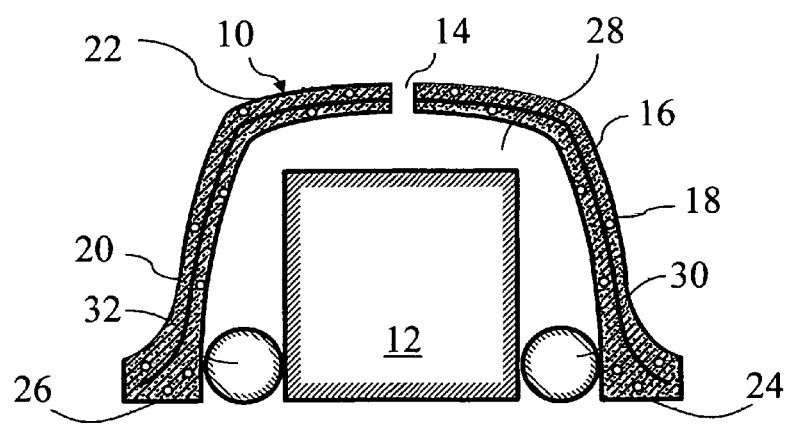
FIG. 2 illustrates a cross-sectional view of the protective cap over a conduit in the embodiment of the present invention.

FIG. 2 illustrates a cross-sectional view of the protective cap 10 disposed over the conduit 12. The protective cap may include legs 18, 20 and a span 22 between the legs 18, 20. The span 22 may preferably be arcuately shaped to provide strength to the protective cap 10 as it withstands the pressures of the fill material disposed therearound, and the impact of vehicles traveling on a road disposed above the protective cap 10. However, it should be noted that the span 22 may be any shape, such as horizontal, between the legs 18, 20. In another embodiment, the protective cap may consist entirely of two legs joined together to form a triangular cross-section, and forming a point at the top of the protective cap. In such a case, the protective cap does not include a span 22, as described above with reference to FIG. 2.

The legs 18, 20 may include base portions 24, 26, whereby the base portions 24, 26 may contact the earth or fill material foundation where the conduit 12 rests. The base portions 24, 26 may preferably be planar with an underside of the conduit 12. However, it should be noted that the protective cap 10 may sit in a different plane than the conduit 12, such as in a plane above the conduit 12 or in a plane below the conduit 12. Moreover, while it is preferable that the base portions 24, 26 sit in the same plane as each other, it may be that the base portion 24 sits in a different plane than the base portion 26, whereby the protective cap may rest tilted. Alternatively, the protective cap 10 may have legs 18, 20 that are different in length from each other so that the base portions 24, 26 may sit in different planes without causing tilting of the protective cap 10.

In a preferred embodiment the span 22 may have an interior surface and an exterior surface. The exterior surface may be curved concavely between the legs 18, 20. The interior surface may be curved concavely between base portion 24 and base portion 26. The term concave is used in the mathematical context wherein a curve is concave if a line segment drawn between any two points on the curve lies below the curve. Additionally, the exterior surface may be convex between leg 18 and base portion 24 and between leg 20 and base portion 26. The term convex is used in the mathematical context wherein a curve is convex if a line segment drawn between any two points on the curve lies above the curve. The mathematical context of convex and concave is used herein consistently such that the curvatures of the exterior surface and interior surface may be easily determined from a cross-section as seen in FIG. 2. Of course, the ordinary definition of convex and concave may be used without altering the preferred embodiment of the present invention wherein the exterior surface has both a convex and concave curve thereon.

The protective cap 10 may be positioned over the conduit 12 to form a protective barrier against fill material that may be disposed around and on top of the protective cap 10. The conduit 12 may sit within a space 28 between the conduit 12 and the protective cap 10.

Alternately, the conduit 12 may be surrounded by a protective substance that may completely fill space 28. The protective substance may be a foam, gel, or otherwise flowable fill known to one skilled in the art that may encompass and protect conduit 12 within space 28. Specifically, an individual may fill space 28 with a protective substance, such as a protective foam, flowable fill or other like protective substance, by injecting the protective substance in the one or more lifting holes 14. The protective substance may then fill or, preferably, expand within space 28 and surround and shield conduit 12 with an additional level of protection. Plugs may then be disposed within the lifting holes 14 after the protective cap 10 is moved into place and protective substance is injected into protective cap 10 to keep water, soil, rocks or other material from entering the space 28 within the protective cap 10 and damaging either the protective substance or the conduit or other subsurface structure contained therein.

The protective cap 10 may have dimensions such that the protective cap may fulfill its intended purposes, such as, for example, for being disposed above conduit and protecting the conduit. However, the protective cap 10 may further have dimensions allowing the protective cap 10 to be movable. For example, the protective cap 10 may have a length that is, preferably, about 8 feet. However, it should be noted that the protective cap 10 may be any length.

In addition, the protective cap 10 may have a height, measured from the underside of the bases 24, 26 to the apex of the span 22, as shown in FIG. 2. The height of the protective cap 10 may be such that it fully encloses and encapsulates conduit contained within the protective cap 10, but preferably leaving sufficient space between the conduit 12 and the protective cap 10 to not contact the protective cap 10, even if shifting of the conduit 12 occurs. In the example demonstrated in FIG. 2, the conduit 12 may be a tile duct measuring 2 feet by 2 feet. The protective cap 10 may have a height measured from the underside of the bases 24, 26 to the apex of the span 22 of 2 feet 9 inches. Preferably, the thickness of the protective cap 10 may vary at locations from the bases 24, 26 to the legs 18, 20 and the span 22, and may further be dependent on the material utilized to make the protective cap 10. As illustrated in FIG. 2, the span 22 may have a thickness of about 3 inches, for example. Each of the legs 18, 20 may have thicknesses of about 3 inches, for example. Finally, the thicknesses of the bases from the underside of the bases to the terminal point between the bases 24, 26 and the legs 18, 20 may be about 4 inches.

Moreover, the protective cap may have a width, measured from an outside edge of the first base 24 to an outside edge of the second base 26. The width of the protective cap 10 may be such that it fits the conduit 12, and any other conduit and/or pipes that may be added, as noted below. As illustrated in FIG. 2, the width of the protective cap 10 may be about 4 feet 8 inches, although any width may be utilized, as necessary to fulfill the intended purposes of the protective cap 10.

Alternatively, one or more pipes 30, 32 may be disposed adjacent the conduit 12 within a space 28 formed between the protective cap 10 and the conduit 12. The pipes 30, 32 may be made from any material apparent to one having ordinary skill in the art, such as metal, PVC plastic, or other like material, for carrying wires, cables, water, gas or other like material.

Also shown in the cross-sectional view of FIG. 2, the reinforcing material 16 disposed within the protective cap 10. Specifically, the reinforcing material 16 may be disposed within the protective cap 10 from the base portion 24, through leg 18, through span 22, through leg portion 20 and terminate at base portion 26 to provide strength and rigidity to the protective cap 10 in all sections of the protective cap 10. However, it should be noted that the reinforcing material 16 may be disposed in only one or more sections of the protective cap 10 to provide strength and rigidity in certain discrete locations. Preferably, however, the reinforcing material 16 is disposed throughout the protective cap 10.

Figure 3:
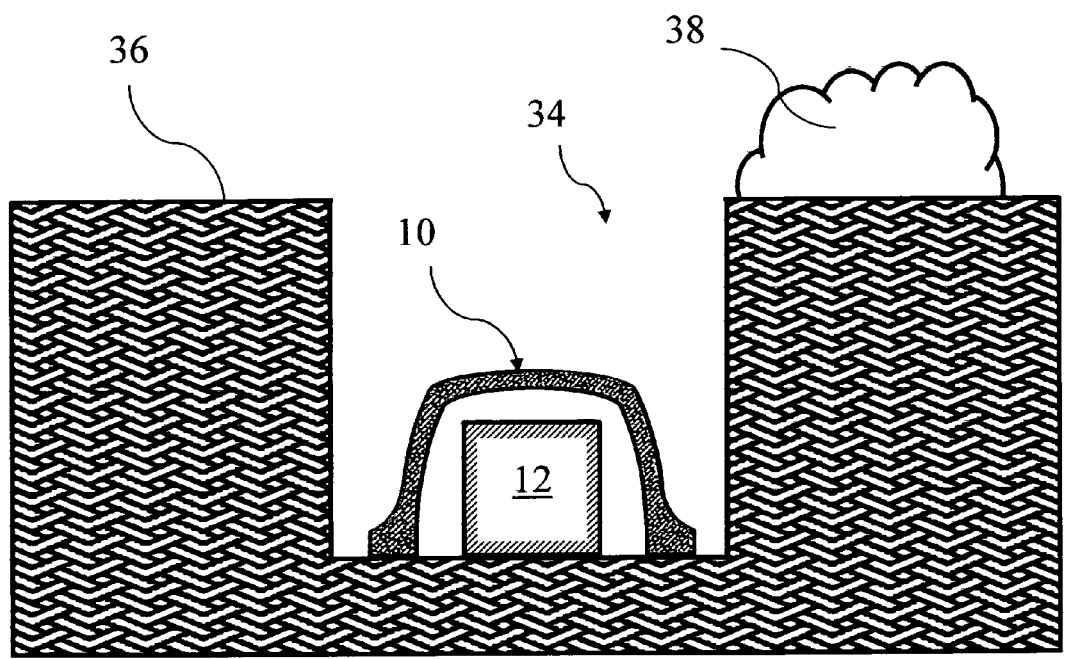
FIG. 3 illustrates a cross-sectional view of the protective cap over a conduit positioned in a trench in an embodiment of the present invention.

As shown in FIG. 3, a cross-sectional view of protective cap 10 is shown and described. Protective cap 10 may be disposed within a trench 34 some length below the surface 36. The protective cap 10 may be positioned over the conduit 12 to form a protective barrier against fill material 38 that may be disposed around and on top of the protective cap 10. Fill material 38 may be disposed within trench 34 after protective cap 10 is positioned over conduit 12, covering or otherwise burying protective cap 10 within the ground. Fill material 38 may fill trench 34 to surface 36. Protective cap 10 may protect against or otherwise prevent damage caused by pressures applied on top of fill material 38 at surface 36. Fill material 38 may be native soils, granular trench backfill, or other material known to one skilled in the art. In a preferred embodiment, a roadway may be constructed at the surface 36 after fill material 38 is disposed around and above protective cap 10.

Figure 4:
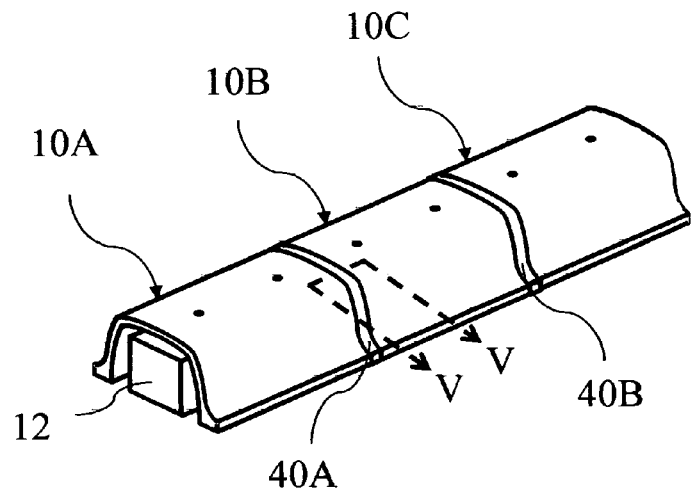
FIG. 4 illustrates an elevated perspective view of multiple protective cap sections connected together via joints in an embodiment of the present invention.

FIG. 4 illustrates multiple protective caps connected in series. A first protective cap 10A may be disposed adjacent to a second protective cap 10B. First protective cap 10A may be secured to second protective cap 10B by a first protective sheet 40A. First protective sheet 40A may have a width spanning the distance of a space that may be formed between first protective cap 10A and second protective cap 10B and may be wider to be sealed to first protective cap 10A and second protective cap 10B, as described below. First protective sheet 40A may have a length spanning the perimeter from one leg of protective caps 10A, 10B to the other leg of protective caps 10A, 10B. First protective cap 10A may be secured to second protective cap 10B such that the length of first protective cap 10A and second protective cap 10B span a length of conduit 12. First protective sheet 40A may keep water, soil, rocks or other material from entering between first protective cap 10A and second protective cap 10B. A third protective cap 10C may be secured to second protective cap 10B by a second protective sheet 40B such that the length of first protective cap 10A, second protective cap 10B, and third protective cap 10C span the further length of conduit 12. Further, second protective sheet 40B may be secured to second protective cap 10B and third protective cap 10C in the same or a similar manner as described above with respect to protective sheet 40A. Of course, any number of protective caps and protective sheets may be used such that the length of conduit 12 is protected.

Conduits may be of different sizes along a path or may branch in different directions. When connecting multiple protective caps in series, alternative sizes of protective caps may be necessary. In an alternate embodiment of the present invention, a transitional protective cap may be utilized. The transitional protective cap may be larger than a protective cap 10 and may be disposed, generally, on top of and overlapping protective cap 10. The transitional protective cap (not shown) and protective cap 10 may be secured by a protective sheet that may keep water, soil, rocks or other material from entering between the transitional protective cap and protective cap 10. Protective sheet may be arcuate or another shape known to one skilled in the art that makes the surface between the transitional protective cap and protective cap 10 smooth. In another embodiment, the transitional protective cap may be angled from a first end of the transitional protective cap to a second end of the transitional protective cap to link in series two protective caps having different heights. As described above, a protective sheet may be utilized to cover any space and/or seal the transitional protective cap to adjacent protective caps, as described above.

Alternatively, protective cap having different shapes than described herein may be utilized. More specifically, a protective cap (not shown) may be branched or may form a cross shape, for covering conduits or other subsurface structures that may branch, intersect or otherwise splits into different directions. Thus, a branched or crossed protective cap (not shown) may allow one or more protective caps 10 (as described above) to be secured to the branched, crossed or otherwise split protective cap. Specifically, the transitional protective cap may be y-shaped, x-shaped, or another shape known to one skilled in the art that may allow the protection of conduit that may branch or split into numerous directions.

Figure 5:
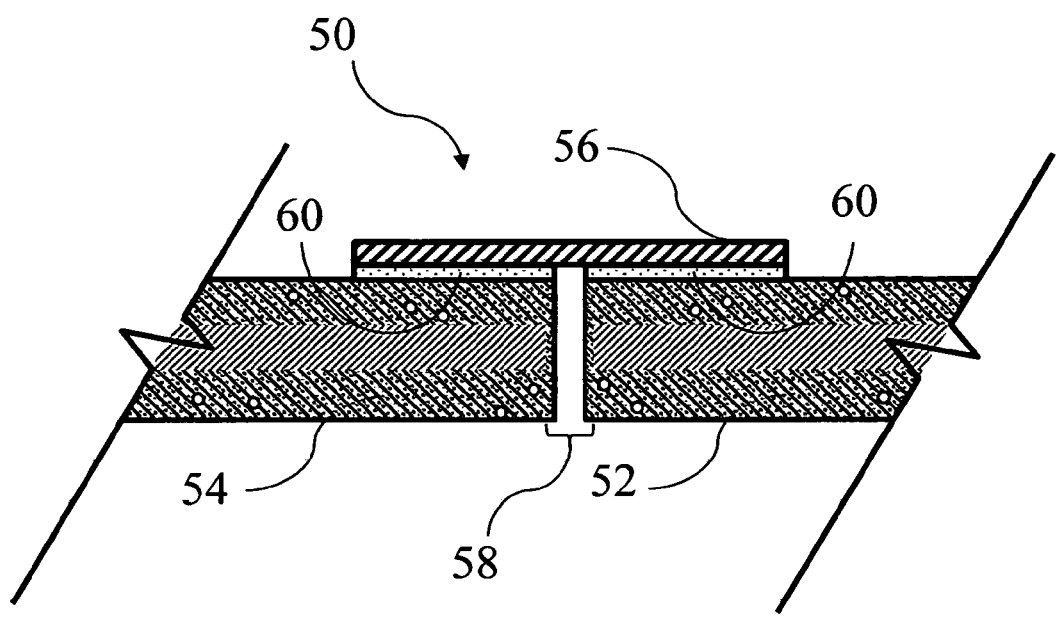
FIG. 5 illustrates close-up cross-sectional view of a joint between cap sections in an embodiment of the present invention.

Referring now to FIG. 5, a cross-sectional view of a joint 50 is shown, whereby two protective caps are joined together in series. Specifically, an end of a first protective cap 52 may be joined to an end of a second protective cap 54 to lengthen the effective area of protection for a conduit disposed beneath. A protective sheet 56 may be disposed over a space 58 between the first protective cap 52 and the second protective cap 54. Preferably, the space 58 between the first protective cap 52 and the second protective cap 54 may be no greater than about ⅜ inch, although the space 58 may be any distance. The space 58 allows for expansion and contraction of the materials utilized herein, such that damage may not be done to the caps when utilized to protect subsurface conduit.

The protective sheet 56 may be made from any material apparent to one of ordinary skill in the art to allow the sheet to restrict the movement of soil, rocks, water or other like material and prevent the same from infiltrating the space 28 within the first protective cap 52 and the second protective cap 54. For example, the protective sheet 56 may be made from butyl rubber, and may be a width whereby the space 58 between the first protective cap 52 and the second protective cap 54 may be fully covered.

Moreover, the protective sheet 56 may preferably be wide enough so that it may be adhered using adhesive 60 to both the first protective cap 52 and the second protective cap 54. The adhesive 60 may be any adhesive that adheres to both the protective sheet 56 and the first protective cap 52 and the second protective cap 54. For example, the adhesive may be tar, and may be disposed both between the protective sheet 56 and the first protective cap 52 and the second protective cap 54, but also may be placed over the protective sheet 56 to aid in adhering the protective sheet 56 to the first protective cap 52 and the second protective cap 54 and also providing further protection to the protective sheet 56.

In a non-limiting example of the present invention, to utilize the protective cap 10 and/or a plurality of protective caps in series, as described herein, the street to be repaired and/or replaced may first be excavated. After removal of the overburden from the conduit to be protected, areas may be cleared on opposite sides of the conduit to create a foundation for the protective cap to sit on. Preferably, the areas may be about 24 inches wide on both sides of the conduit, although the exact size of the areas to be cleared is dependent, generally, on the size of the protective cap to be placed over the conduit. The foundation at this location may preferably be made level from side to side. The bearing capacity of the foundation at this location should be sufficient to bear the load of the protective cap. The protective cap may be very heavy, and the foundation may preferably have a bearing load of up to about 3000 pounds per square foot.

At this point, if further cabling, conduit or ductwork is to be installed, these may be placed adjacent the existing conduit. A first protective cap may then be lifted using a crane or lift, extending a chain or cable over the first protective cap and disposing the chain or cable having a T-bar within the lifting holes of the protective cap. The protective cap may be installed over the conduit and rest on the foundation, and the T-bars may be removed from the lifting holes. Generally, the first protective cap may preferably be placed so that it is centered over the conduit and over any new cabling, conduit or ductwork installed, and further the first protective cap may preferably be placed level from side to side.

A second protective cap may then be placed next to the first protective cap in series so that the adjacent ends of the first and second protective caps have no more than, preferably, a ⅜ inch gap between the adjacent ends of the first and second protective caps. The joint between the first and second protective caps may be covered with, preferably, a piece of butyl rubber sheet that is preferably about 3/16 inch thick and about 6 inches wide. An adhesive may be placed on the butyl rubber sheet and the butyl rubber sheet may be preferably placed between the butyl rubber sheet and the first and second protective caps, although the adhesive may be applied on an upper surface of the butyl rubber sheet to provide further protection. The lifting holes may be plugged with precast plugs made, preferably, from the same material as the first and second protective caps.

Further additional protective caps may be placed over the conduit as needed based on the length of conduit necessary for protecting the conduit. The additional protective caps may be placed serially in end-to-end arrangement over the conduit and sealed together, as described above.

Finally, the trench may be filled with fill material to fully cover the protective caps to rebuild the street thereabove. Generally, the trench should be filled with native soils. However, if the protective caps are within about two feet of the edge of pavement, the trench may preferably be filled with granular trench backfill. The street may then be rebuilt as known to one having ordinary skill in the art.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. An apparatus for protecting subsurface conduit, the apparatus comprising:

a protective cap having a first end, a second end, and a non-corrugated length between the first end and the second end, further having, in cross section, a first leg having a first base with a first planar bottom surface and a first transition portion between the first leg and the first base, a second leg having a second base having a second planar bottom surface and a second transition portion between the second leg and the second base, and an arcuately-shaped protective span having an apex between the first leg and the second leg, the first leg, the second leg and the protective span having a consistent thickness between the first transition portion and the second transition portion, wherein the protective cap has an interior surface and an exterior surface, the protective cap comprising a rigid material with a reinforcing material therein between the interior surface and the exterior surface;

wherein the protective cap is unitary without seams or joints from the first planar bottom surface of the first base through the first transition portion, the protective span and the second transition portion to the second planar bottom surface of the second base;

the interior surface curved concavely from the first base to the second base; and the first base being wider than the first leg and the second base being wider than the second leg, the exterior surface curved concavely between the first leg and the second leg relative to an imaginary line disposed between the first leg and the second leg, the exterior surface smoothly curved convexly along the first transition portion between the first leg and the first base relative to an imaginary line disposed between the first leg and the first base and along the second transition portion between the second leg and the second base relative to an imaginary line disposed between the second leg and the second base, the exterior surface extending straight downwardly from the first transition portion to the first planar bottom surface of the first base, and the exterior surface extending straight downwardly from the second transition portion to the second planar bottom surface of the second base;

wherein the first planar bottom surface of the first base and the second planar bottom surface of the second base run uniformly over the length of the protective cap.

2. The apparatus of claim 1 further comprising:
a lifting hole disposed at the apex of the protective span.

3. The apparatus of claim 1 wherein the rigid material is selected from the group consisting of cement, concrete, metal, plastic, fiberglass, composite, and combinations thereof.

4. The apparatus of claim 1 wherein the reinforcing material is selected from the group consisting of metal, rebar, plastic, fiberglass, and combinations thereof.

5. The apparatus of claim 2 further comprising:
a lifting hole plug disposed within the lifting hole.

6. A system for protecting subsurface conduit, the system comprising:
a first protective cap having a first end, a second end and a length between the first end and the second end, the first protective cap having, in cross-section, a first leg having a first base with a first planar bottom surface and a first transition portion between the first leg and the first base, a second leg having a second base with a second planar bottom surface and a second transition portion between the second leg and the second base, and an arcuately-shaped protective span between the first leg and the second leg, the first protective cap further having a non-corrugated length, the protective cap having a consistent thickness between the first transition portion and the second transition portion, wherein the first protective cap has an interior surface and an exterior surface, the first protective cap comprising a rigid material with a reinforcing material therein between the interior surface and the exterior surface, wherein the protective cap is unitary without seams or joints from the first planar bottom surface of the first base, through the first transition portion, the protective span and the second transition portion to the second planar bottom surface of the second base, the interior surface curved concavely from the first base to the second base, and the first base being wider than the first leg and the second base being wider than the second leg, the exterior surface curved concavely between the first leg and the second leg relative to an imaginary line disposed between the first leg and the second leg, the exterior surface smoothly curved convexly along the first transition portion between the first leg and the first base relative to an imaginary line disposed between the first leg and the first base and along the second transition portion between the second leg and the second base relative to an imaginary line disposed between the second leg and the second base, the exterior surface extending straight downwardly from the first transition portion to the first planar bottom surface of the first base, the exterior surface extending straight downwardly from the second transition portion to the second planar bottom surface of the second base, wherein the first planar bottom surface of the first base and the second planar bottom surface of the second base run uniformly over the length of the protective cap;
a second protective cap having a first end, a second end and a length between the first end and second end, the second protection cap having, in cross-section, a first leg, a second leg, and a protective span between the first leg and the second leg, the second protective cap further having a length;
the first protective cap and the second protective cap disposed end to end in series; and
a protective sheet connecting the first protective cap and the second protective cap.

7. The system of claim 6 further comprising:
a space between the first protective cap and the second protective cap, the protective sheet spanning the space and adhered to the first protective cap and the second protective cap.

8. The system of claim 6 wherein the rigid material is selected from the group consisting of cement, concrete, metal, plastic, fiberglass, composite, and any combination thereof.

9. The system of claim 6 wherein the reinforcing material is selected from the group consisting of metal, rebar, plastic, fiberglass, and combinations thereof.

10. The system of claim 7 wherein the protective sheet is adhered to the first protective cap on an end of the first protective cap and further wherein the protective sheet is adhered to the second protective cap on an end of the second protective cap.

11. The system of claim 6 wherein on at least one of the first and second protective caps, the protective span further comprises a lifting hole.

* * * * *